(12) United States Patent
Neti et al.

(10) Patent No.: US 11,293,827 B1
(45) Date of Patent: Apr. 5, 2022

(54) THIN SECTION COMMERCIAL CABIN INSULATION WITH HIGH THERMAL R-VALUE

(71) Applicant: Rockwell Collins, Inc., Cedar Rapids, IA (US)

(72) Inventors: Venkata Prasanth Suman Neti, Milton Keynes (GB); Thomas J. Pitts, Leighton Buzzard (GB); Peter John Leslie Burd, Burry Port (GB)

(73) Assignee: Rockwell Collins, Inc., Cedar Rapids, IA (US)

( * ) Notice: Subject to any disclaimer, the term of this patent is extended or adjusted under 35 U.S.C. 154(b) by 275 days.

(21) Appl. No.: 16/182,070

(22) Filed: Nov. 6, 2018

(51) Int. Cl.
| | |
|---|---|
| *G01L 19/14* | (2006.01) |
| *B32B 27/12* | (2006.01) |
| *B32B 3/26* | (2006.01) |
| *B32B 5/02* | (2006.01) |
| *B32B 27/28* | (2006.01) |
| *G01L 11/02* | (2006.01) |
| *B64D 11/00* | (2006.01) |
| *B64D 11/04* | (2006.01) |

(52) U.S. Cl.
CPC ............ *G01L 19/149* (2013.01); *B32B 3/266* (2013.01); *B32B 5/022* (2013.01); *B32B 27/12* (2013.01); *B32B 27/281* (2013.01); *B32B 2260/021* (2013.01); *B32B 2307/304* (2013.01); *B32B 2307/3065* (2013.01); *B32B 2605/18* (2013.01); *B64D 11/0007* (2013.01); *B64D 11/04* (2013.01); *G01L 11/02* (2013.01)

(58) Field of Classification Search
CPC .... B32B 5/22; B32B 5/30; B32B 3/04; B32B 5/24; B32B 29/002; B32B 29/04; B32B 2307/304; B32B 2264/12; B32B 2264/108; B32B 2260/025; B32B 2419/00; C01B 33/18; B29K 2105/251; B29K 2077/00; B29C 2043/182; Y10T 428/231
See application file for complete search history.

(56) References Cited

U.S. PATENT DOCUMENTS

| | | | |
|---|---|---|---|
| 8,852,708 B2 * | 10/2014 | Kim | F16L 59/065 428/69 |
| 9,272,475 B2 | 3/2016 | Ranade et al. | |
| 9,376,805 B2 | 6/2016 | Rochefort et al. | |
| 9,689,604 B2 | 6/2017 | Wu | |
| 9,828,165 B2 | 11/2017 | Ranade et al. | |
| 10,065,389 B2 | 9/2018 | Park et al. | |

(Continued)

*Primary Examiner* — Brandi N Hopkins
(74) *Attorney, Agent, or Firm* — Suiter Swantz pc llo

(57) ABSTRACT

An insulating tile may be attached to an interior or exterior surface adjacent to a chilled compartment of an aircraft galley structure to increase the overall thermal resistance of the galley structure (as well as the capacity of the galley air/liquid chiller system). The insulating tile includes an outer barrier encapsulating a thermally resistant core material within a vacuum, both the outer barrier and the core material resistant to flame propagation and thus suitable for commercial aircraft use. The insulating tile may further include getters within the core material to maintain the vacuum (and thus the thermal resistance of the tile) by absorbing moisture. Scannable passive pressure and/or moisture sensors may be placed within the core material for reporting at a glance the state of the vacuum, so that a particular tile may be serviced or replaced if necessary.

18 Claims, 5 Drawing Sheets

(56) References Cited

U.S. PATENT DOCUMENTS

| | | | |
|---|---|---|---|
| 2013/0149481 A1* | 6/2013 | Hiemeyer | B32B 27/12 |
| | | | 428/47 |
| 2014/0178626 A1* | 6/2014 | Min | B32B 3/08 |
| | | | 428/69 |
| 2014/0339241 A1 | 11/2014 | Cresswell et al. | |
| 2016/0059448 A1 | 3/2016 | Ranade et al. | |

* cited by examiner

THIN SECTION COMMERCIAL CABIN INSULATION WITH HIGH THERMAL R-VALUE

BACKGROUND

Commercial aircraft flying long distances (e.g., transoceanic routes) may store perishable food within chiller compartments, e.g., fixed compartments incorporated into a larger galley structure or detachable galley carts or trolleys stowable in the galley structure (and removable therefrom for inflight meal service). When stowed in the galley structure, the carts and trolleys may be maintained at a safe storage temperature (e.g., 4 C/39.2° F.) by circulated air chilled by an air chiller unit (ACU) and distributed through the cart bays in which the carts and trolleys are stowed. Increasing the number of carts and trolleys maintainable at a safe temperature by a given chilling system would allow the storage of more perishable food and may, for example, allow for a second hot meal service on long-haul flights.

However, this goal may be complicated by a variety of safety and commercial factors. For example, weight and available space are both at a premium onboard; likely any additional chiller compartments would come at the expense of non-chiller compartments and bays. Government (e.g., Federal Aviation Administration (FAA)/European Aviation Safety Agency (EASA)) and manufacturer certification requirements concerning materials and material combinations render a nontrivial challenge the addition of below-workdeck (BWD) chiller carts and above-workdeck (AWD) chiller compartments. Furthermore, any galley refrigeration/chiller system has a finite capacity governed by its own set of factors, e.g., the size, volume, and design characteristics of the galley structure, associated monuments, internal compartments; the average thermal resistance of structural and nonstructural walls and panels (including the total thermal resistance R of nonmetallic panels less conductive loss due to embedded blocks, reinforcing doublers, edge extrusions, and other metallic cold bridges); the airflow circulation system and the potential for chilled-air leakage. Exceeding the capacity of an air chiller system may result in the deletion of chiller compartments and carts.

These challenges may be alleviated by, for example, increasing the average thermal resistance of a galley monument or structure adjacent to chiller compartments by adding high R-value insulation. However, complicating this potential solution are manufacturers' allowed structure footprints, airworthiness requirements (e.g., FAA/EASA) for any insulating materials used, and any hygiene requirements associated with food service (e.g., per the US Food and Drug Administration (FDA) or like international counterparts).

SUMMARY

An insulating tile may be attached to an interior or exterior surface adjacent to a chiller compartment of an aircraft galley structure to increase the overall thermal resistance of the galley structure (as well as the capacity of the galley air chiller system). The insulating tile includes an outer barrier film encapsulating a thermally resistant core material within a vacuum. Both the outer barrier film and the core material encapsulated within are resistant to flame propagation, and thus suitable for commercial aircraft use. The insulating tile may further include getters or desiccants within the core material to maintain the vacuum (and thus the thermal resistance of the tile) by absorbing moisture. Scannable passive pressure/moisture sensors may be placed within the core material for reporting at a glance the state of the vacuum, so that a particular tile may be serviced or replaced if necessary.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1A:
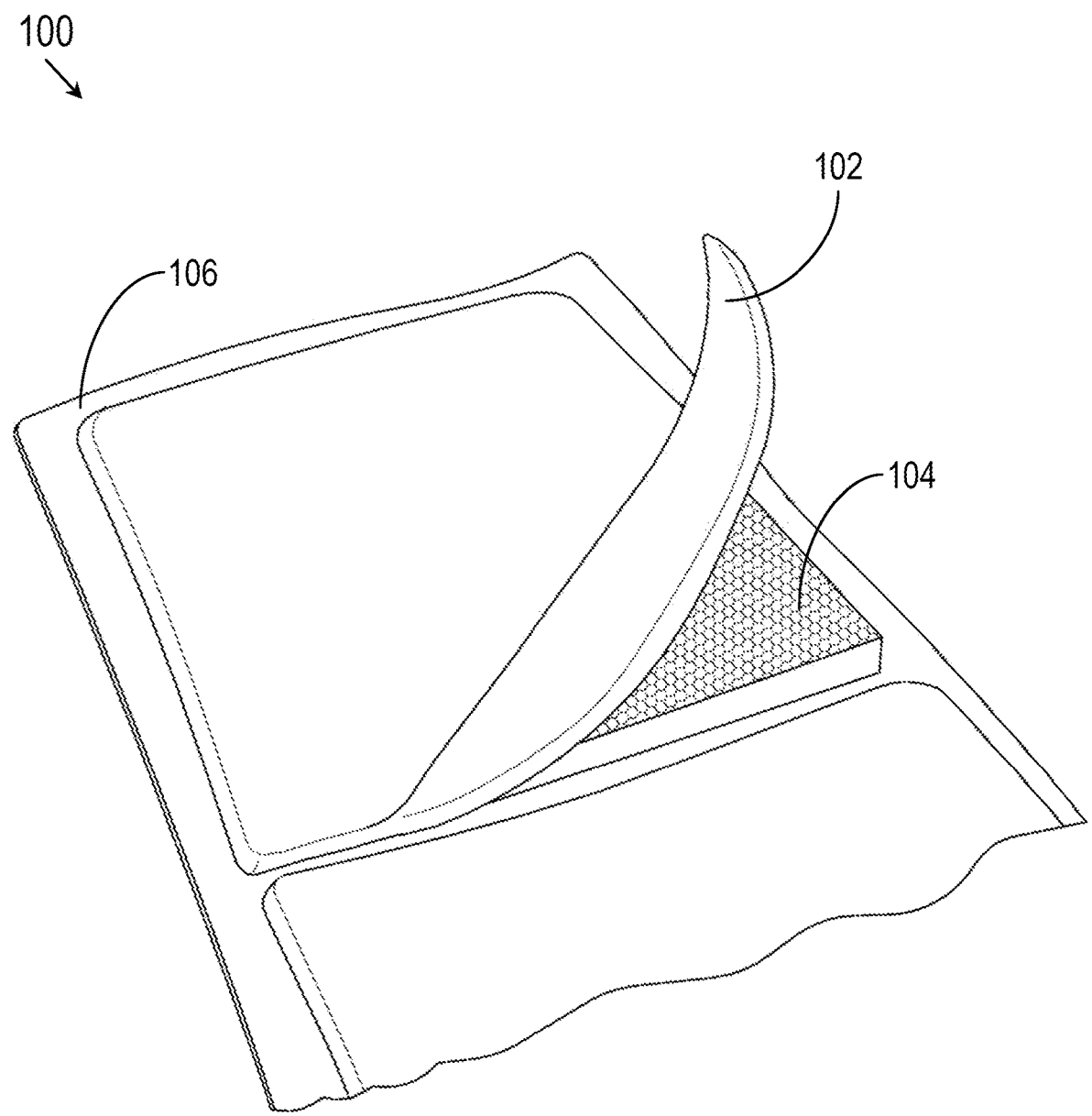
FIGS. 1A and 1B respectively depict an exemplary embodiment of an insulating tile and a core material thereof according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a compact vacuum insulation panel (VIP), or insulating tile, deployable to increase thermal resistance within a galley structure, particularly adjacent to chiller compartments. As the insulating tile is comprised of materials compliant with public and private regulations governing airworthiness and resistance to fire propagation (e.g., FAA/EASA) as well as hygiene requirements with respect to food preparation (e.g., FDA), the insulating tile may be deployed externally or internally to increase thermal resistance within the galley chiller system. As a result, the required air chilling capacity of the galley structure (e.g., the necessary number of chiller units) may be minimized, or (in the alternative) the available chilling capacity of a galley including a given number of chiller units may be maximized.

Figure 1B:
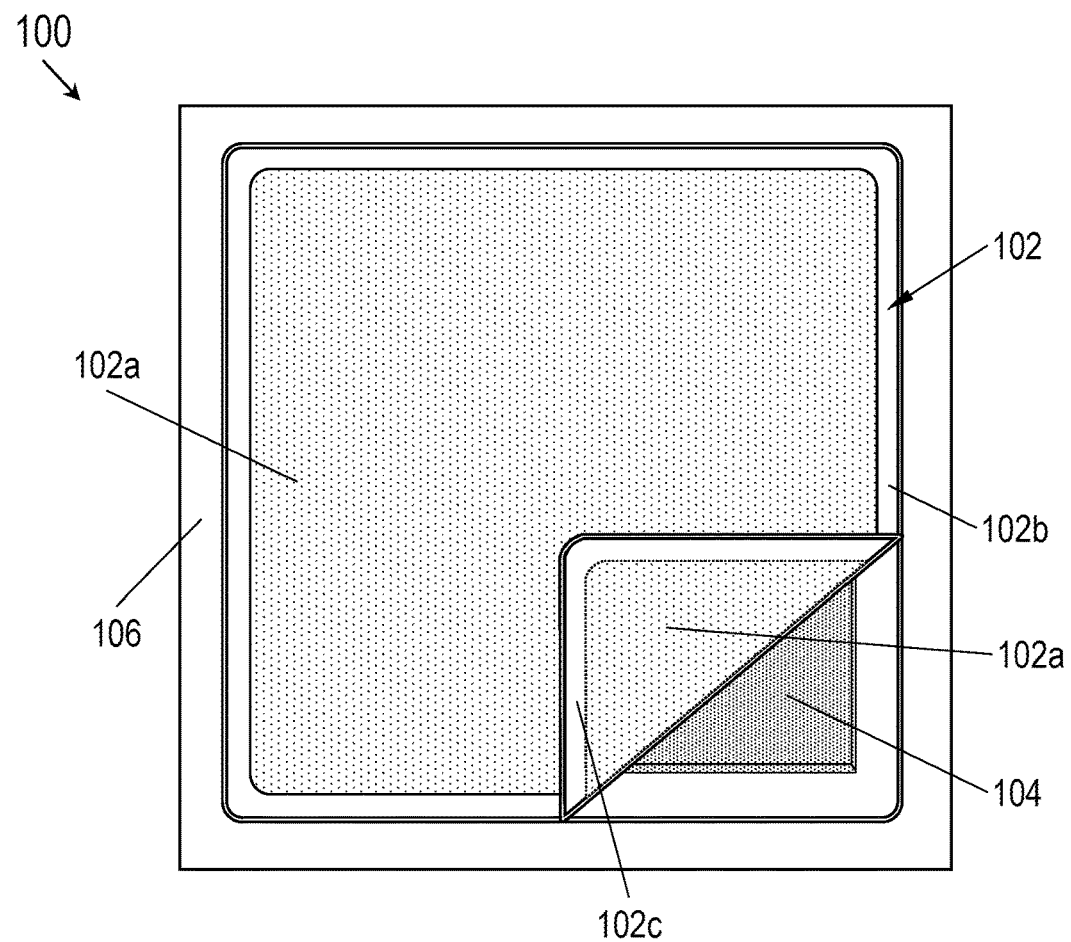

Referring to FIGS. 1A and 1B, an exemplary embodiment of a vacuum insulating tile 100 according to the inventive concepts disclosed herein may include an outer barrier 102 encapsulating one or more thermally efficient core materials 104 within a vacuum system. For example, the outer barrier 102 may be fashioned of a polyimide (PEI) film (e.g., Kapton® developed by DuPont), sufficiently capable of resisting fire propagation as to meet regulatory requirements imposed upon all thermal or acoustic insulating materials utilized aboard commercial aircraft (e.g., 14 CFR § 25.856 (a)). The outer barrier 102 may be non-reinforced or reinforced (102a; e.g., coated on one or both sides (outside 102b, inside 102c) with Teflon®), to enhance the ability of the outer barrier to resist absorption of oxygen and moisture by the encapsulated vacuum system (thus compromising the vacuum and, consequently, the thermal resistance of the insulating tile 100).

The core material 104 may incorporate any appropriate combination of non-woven or fibrous material having a high thermal efficiency similarly resistant to fire propagation, sealed within the vacuum system encapsulated by the outer barrier 102 (e.g., via heat-sealed seam 106). By way of a non-limiting example, the core material 104 may include an aerogel-impregnated thermal blanket or fibrous mat (108), or a fibrous composite mat incorporating material resistant to infrared (IR) radiation (110; e.g., exfoliated graphite), or a combination of both materials. In exemplary embodiments of the insulating tile 100, the core material 104 may include intumescent layers 112 that actively prevent the combustion of a monument within which the insulating tile is deployed by forming a fire-retardant char layer.

The insulating tile 100 may be fashioned as a square or rectangular tile of any appropriate size. The thickness of the insulating tile 100 may depend on the precise composition of core materials 104 and the desired thermal resistance R. For example, the thickness of the insulating tile 100 may vary from approximately 1.5 mm (~0.059") to 13 mm (~0.512") or larger; the potential thermal resistance R of the insulating tile may vary from 0.37 to 3.21 m²K/W (in preferred embodiments, R≤0.5 m²K/W).

Figure 2A:
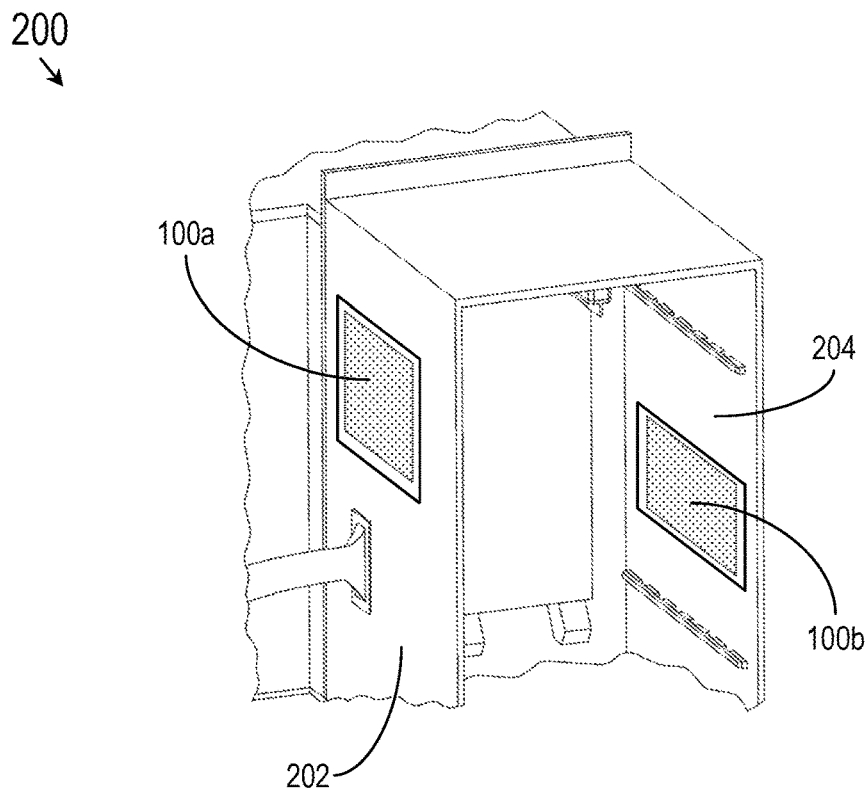
FIGS. 2A and 2B illustrate deployment of the insulating tile of FIG. 1A.

Referring to FIG. 2A, the insulating tiles 100a-b may be implemented and may function similarly to the insulating tile 100 of FIG. 1A, except that the insulating tiles 100a-b may be deployed adjacent to a chiller compartment 200 to increase the average thermal resistance of the galley structure or monument within which the chiller compartment is situated. For example, the chiller compartment 200 may be a cart bay capable of stowing one or more chiller carts or trolleys in a stable inflight position (from which the carts/trolleys may be removed for catering or meal service). The insulating tile 100a may be attached to an exterior surface (202) of the chiller compartment 200, or the insulating tile 100b may be attached to an interior surface (204) of the chiller compartment.

Figure 2B:
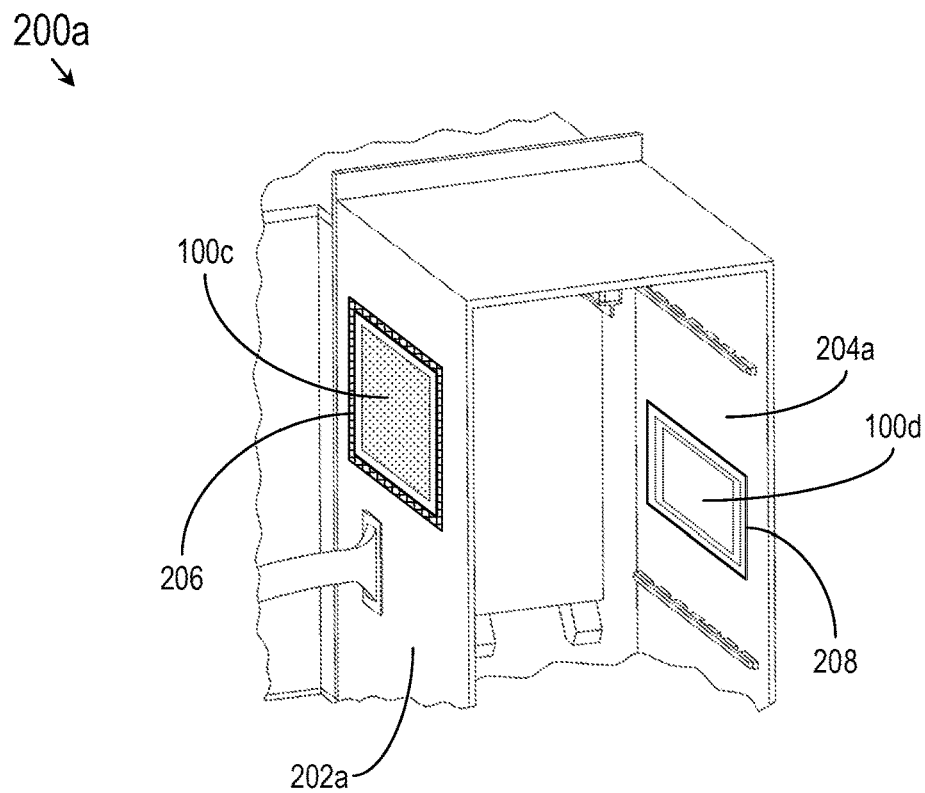

Referring to FIG. 2B, the insulating tiles 100c-d and the exterior surface 202a/interior surface 204a of the chiller compartment 200a may be implemented and may function similarly to the insulating tiles 100a-b, the exterior surface 202, the interior surface 204, and the chiller compartment 200 of FIG. 2A, except that the insulating tile 100c may be partially or fully embedded within the exterior surface 202a. For example, the exterior surface 202a may be a honeycomb or any appropriate like core panel from which a portion 206 has been cored out or removed to partially or fully accommodate the insulating tile 100c. Similarly, the insulating tile 100d may be partially or fully secured behind a removable panel 208 (e.g., a trim panel or other decorative panel) capable of fully or partially concealing the insulating tile 100d. For example, the removable panel 208 may trap the insulating tile 100d against the interior surface 204a or within a recess set into the interior surface 204a.

Figure 3A:
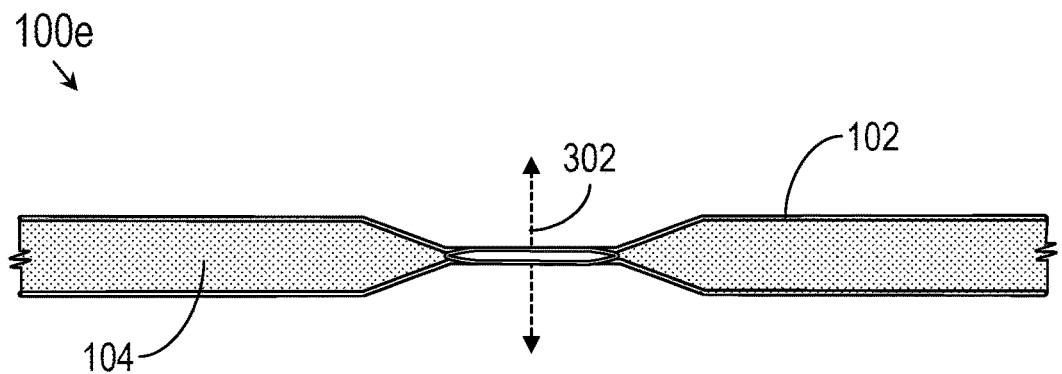
FIGS. 3A and 3B respectively depict the insulating tile of FIG. 1A.
Figure 3B:
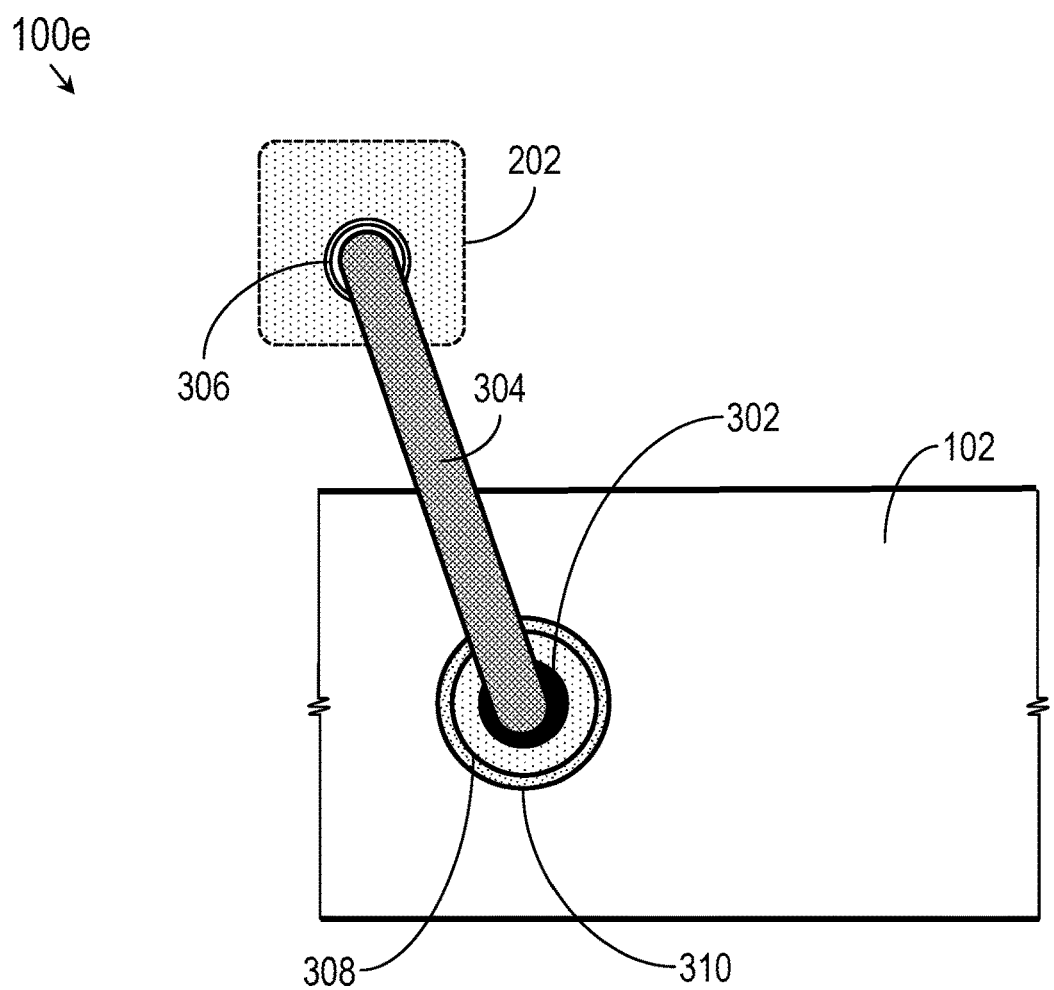

Referring to FIGS. 3A and 3B, the insulating tile 100e may be implemented and may function similarly to the insulating tile 100 of FIG. 1A and the insulating tiles 100a-c of FIGS. 2A/B, except that the insulating tile 100e may incorporate through holes 302. The through holes 302 may allow fixings 304 to penetrate the insulating tile 100e without compromising the vacuum system (e.g., the core material 104 encapsulated within the vacuum by the outer barrier 102). The fixings 304 may allow the insulated tile 100c to be mounted to standoffs, components, electrical harnesses, plumbing pipework, and other fixtures (e.g., bolted to a potted insert 306 set into the exterior surface 202 (or the interior surface 204, FIG. 2) of a chiller compartment (FIG. 2, 200) or galley structure). For example, a portion of the insulating tile 100e may be locally fused (e.g., via impulse plug welder) to create the through hole 302 surrounded by a fused perimeter 308 (circumference) having a tapered edge 310.

Figure 1B:
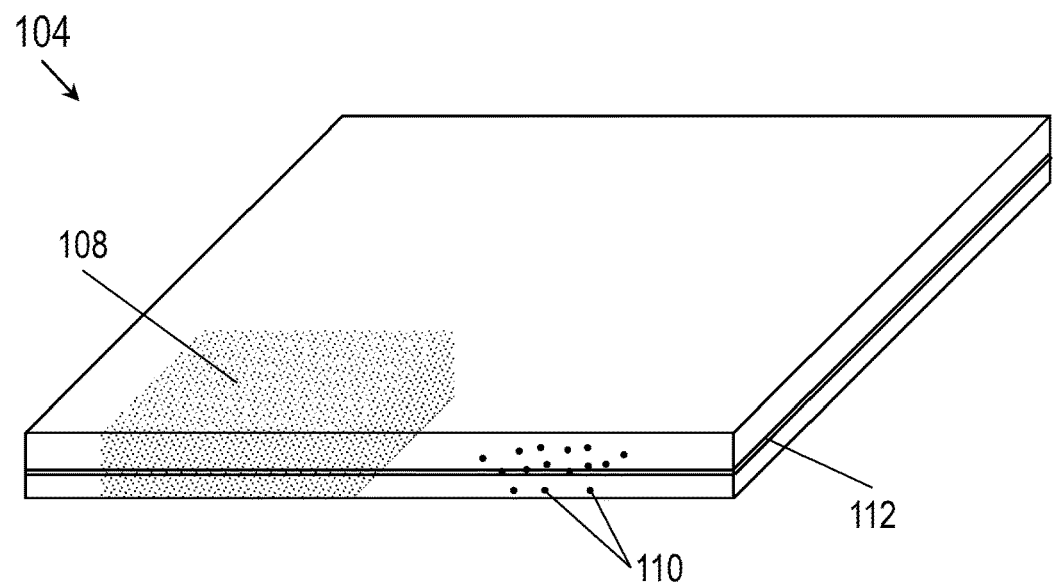
Figure 4:
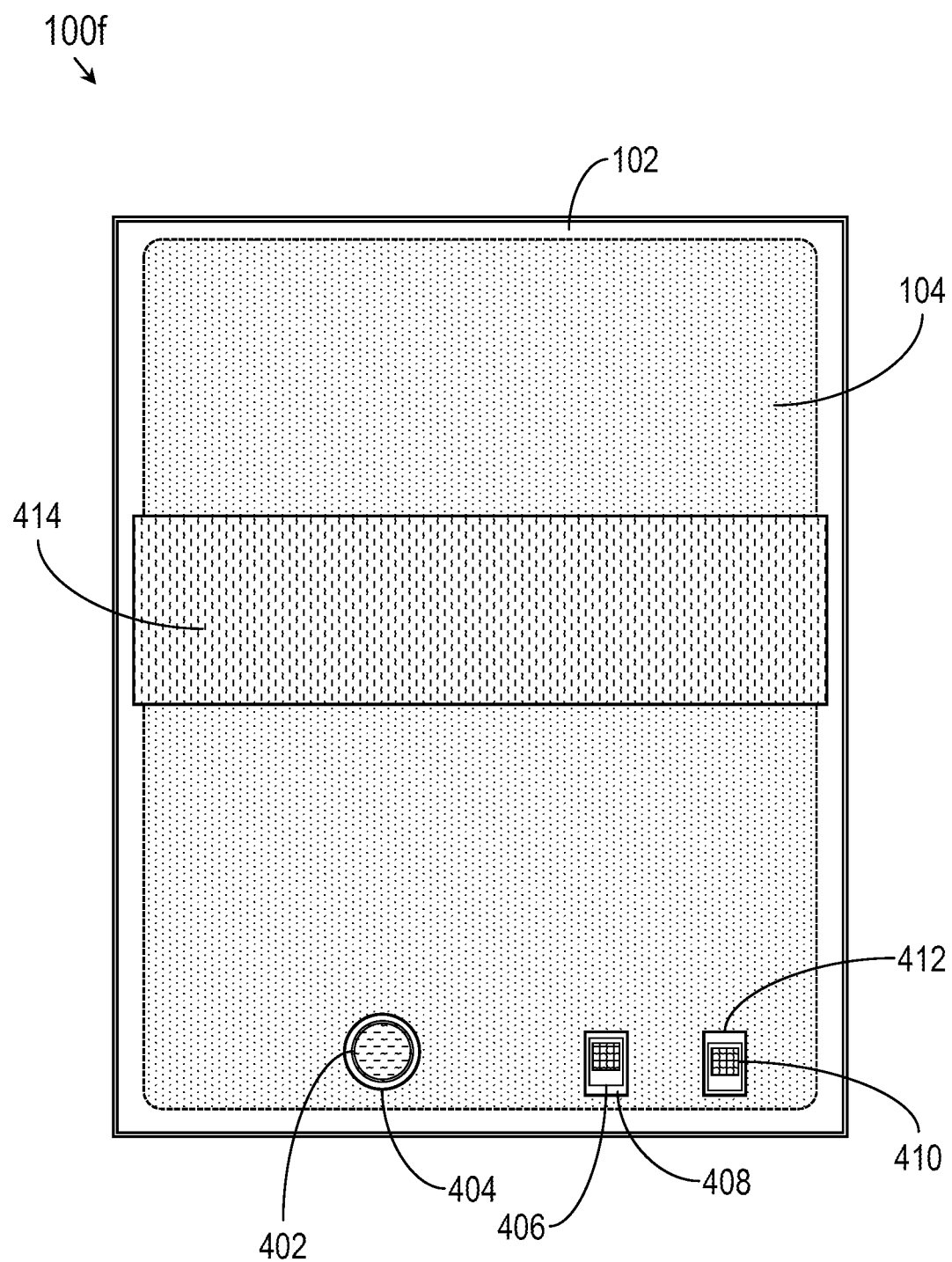
FIG. 4 is a diagrammatic illustration of the insulating tile of FIG. 1A.

Referring to FIG. 4, the insulating tile 100f may be implemented and may function similarly to the insulating tiles 100, 100a-e of FIGS. 1, 2A/B, and 3A/B, except that the insulating tile 100f may include additional components for protecting and maintaining the encapsulated vacuum system. Compromise or failure of the vacuum system (e.g., encapsulated by the outer barrier 102 and within which the core material 104 is situated) may result in a significant degradation of thermal performance (e.g., up to 80 percent), and some degree of decline in performance is to be expected over time as oxygen and moisture are gradually absorbed. However, the insulating tile 100f may include one or more getters 402 (e.g., desiccants or other similarly appropriate reactive materials) encapsulated within the outer barrier 102 to absorb oxygen and moisture from within the vacuum system and thus preserve the overall thermal resistance of the insulating tile. For example, the getters 402 may be positioned within cutouts (404) removed from the core material 104 in order to absorb oxygen and moisture therefrom. In order to efficiently monitor the status of all insulating tiles 100f deployed within a galley structure (or within an aircraft), the insulating tile may include a passive pressure monitor 406 embedded within the vacuum system (e.g., set into a cutout 408 removed from the core material 104). For example, the passive pressure monitor 406 may be an infrared pressure sensor of sub-microprocessor size capable of measuring a current vacuum level within the encapsulated vacuum system of the insulated tile 100f. The embedded passive pressure monitor 406 may be remotely scanned (e.g., via handheld scanner) such that any degraded or failed insulating tile 100f may be identified (and replaced, if necessary) without intrusive and time-consuming inspection of individual insulating tiles. The insulating tile 100f may additionally or alternatively include a passive moisture sensor 410 (e.g., humidity sensor) embedded within the core material 104, similarly scannable to report a moisture or humidity level of the core material within the vacuum system. The passive moisture sensor 410 may be embedded in a separate cutout 412 within the core material; alternatively, pressure sensing and moisture sensing functionality may be incorporated within a single scannable passive sensor embedded within the core material. The insulating tile 100f may further incorporate one or more nonmechanical means of attachment, e.g., dual-lock fasteners (e.g., hook and loop components or other similarly appropriate fasteners wherein a first portion 414 attached to the outer barrier 102 removably attaches to a second portion (not shown) attached to the exterior surface or interior surface (202, 204, FIG. 2A)). For example, the hook and loop components 414 may include a hooked portion mounted to the outer barrier 102, which hooked portion may removably adhere to a corresponding looped portion attached to a particular location on the interior surface 204 or exterior surface 202.

As can be seen above, embodiments of an insulating tile according to the inventive concepts disclosed herein may provide similar thermal resistance to foam insulation as conventionally used aboard commercial aircraft at a fraction of the thickness and weight. While the use of prefabricated composite mat core materials may provide consistent thickness throughout an insulating tile, core materials of variable thickness may be used to locally increase thermal resistance as needed or desired.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. An insulating tile attachable to a surface of a chilled compartment of a galley unit aboard a mobile platform, comprising:
    an outer barrier fashioned of at least one layer of polyimide film,
    the outer barrier resistant to flame propagation, oxygen, and moisture,
    the outer barrier encapsulating in a vacuum system a core material comprising at least one thermally resistant fibrous mat,
    the core material resistant to flame propagation.

2. The insulating tile of claim 1, wherein the outer barrier is coated on at least one side with at least one nonmetallic reinforcing layer, the reinforcing layer configured to enhance the ability of the outer barrier to resist absorption of oxygen or moisture.

3. The insulating tile of claim 1, wherein the core material includes an aerogel-impregnated fibrous mat.

4. The insulating tile of claim 1, wherein the thermally resistant fibrous mat includes an infrared-resistant material.

5. The insulating tile of claim 1, wherein the core material includes at least one intumescent layer.

6. The insulating tile of claim 1, wherein the core material includes at least one material compliant with 14 CFR § 25.856(a).

7. The insulating tile of claim 1, wherein the core material includes at least one of a first core layer having a first thickness and a second core layer having a second thickness.

8. The insulating tile of claim 1, further comprising:
    at least one passive sensor embedded within the vacuum system, the passive sensor configured to measure at least one of a pressure level and a moisture level.

9. The insulating tile of claim 1, wherein the outer barrier includes at least one through-hole surrounded by a fused annular portion.

10. The insulating tile of claim 9, wherein the through-hole is capable of accommodating at least one fixing configured for attaching the tile to the surface.

11. The insulating tile of claim 10, wherein the at least one fixing is capable of attachment to at least one insert set into the surface.

12. The insulating tile of claim 1, wherein the surface includes either an interior surface or an exterior surface of the chilled compartment.

13. The insulating tile of claim 1, further comprising:
    at least one nonmechanical means of attaching the tile to the surface, the nonmechanical means attached to the outer barrier.

14. The insulating tile of claim 1, wherein the insulating tile is secured to the surface by a removable panel capable of at least partially concealing the insulating tile.

15. The insulating tile of claim 1, wherein the insulating tile is at least partially embedded within the surface.

16. The insulating tile of claim 15, wherein at least one portion of the embedding surface is removed to accommodate the insulating tile.

17. The insulating tile of claim 1, further comprising:
    at least one getter embedded within the vacuum system and configured to absorb at least one of oxygen and moisture from the core material.

18. The insulating tile of claim 1, wherein the tile has an average thermal resistance of at least 0.5 $m^2K/W$.

\* \* \* \* \*